United States Patent [19]

Farrington et al.

[11] Patent Number: 5,433,474
[45] Date of Patent: Jul. 18, 1995

[54] AIR BAG COVER ASSEMBLY

[75] Inventors: Stephen D. Farrington, Kingston; John Gray, Union, both of N.H.

[73] Assignee: Davidson Textron, Inc., Dover, N.H.

[21] Appl. No.: 242,454

[22] Filed: May 13, 1994

[51] Int. Cl.$^6$ .............................. B60R 21/22
[52] U.S. Cl. .................. 280/728.3; 280/732
[58] Field of Search ............. 280/728 B, 732, 752, 280/728 R, 731, 730 R

[56] References Cited

U.S. PATENT DOCUMENTS

| | | | |
|---|---|---|---|
| 4,989,896 | 2/1991 | DiSalvo et al. | 280/728 B |
| 5,035,444 | 7/1991 | Carter | 280/732 |
| 5,046,758 | 9/1991 | Rafferty et al. | 280/732 |
| 5,082,310 | 1/1992 | Bauer | 280/728 B |
| 5,108,128 | 4/1992 | Parker et al. | 280/728 B |
| 5,154,444 | 10/1992 | Nelson | 280/728 B |
| 5,280,947 | 1/1994 | Cooper | 280/728 B |
| 5,316,335 | 5/1994 | Gray et al. | 280/728 B |

FOREIGN PATENT DOCUMENTS

| | | | |
|---|---|---|---|
| 5185896 | 7/1993 | Japan | 280/752 |
| 5185897 | 7/1993 | Japan | 280/752 |

*Primary Examiner*—Margaret A. Focarino
*Assistant Examiner*—Peter C. English
*Attorney, Agent, or Firm*—Reising, Ethington, Barnard & Perry

[57] ABSTRACT

An air bag cover assembly includes a support that has an opening for deployment of an air bag and a door that is connected to the support at one end for movement between a closed position closing the opening in the support and an open position for deployment of the air bag. The outer surface of the support and the door are bonded to an elastomeric foam cushion formed in an underlying relationship to a polymeric skin that forms a covering of the cover assembly. When the air bag is deployed, it impacts an impingement member that cooperates with a reaction member so that edge tabs on one of the members rotate laterally in the elastomeric foam cushion and assist in tearing the elastomeric foam cushion and polymeric skin apart to release the air bag door.

16 Claims, 4 Drawing Sheets

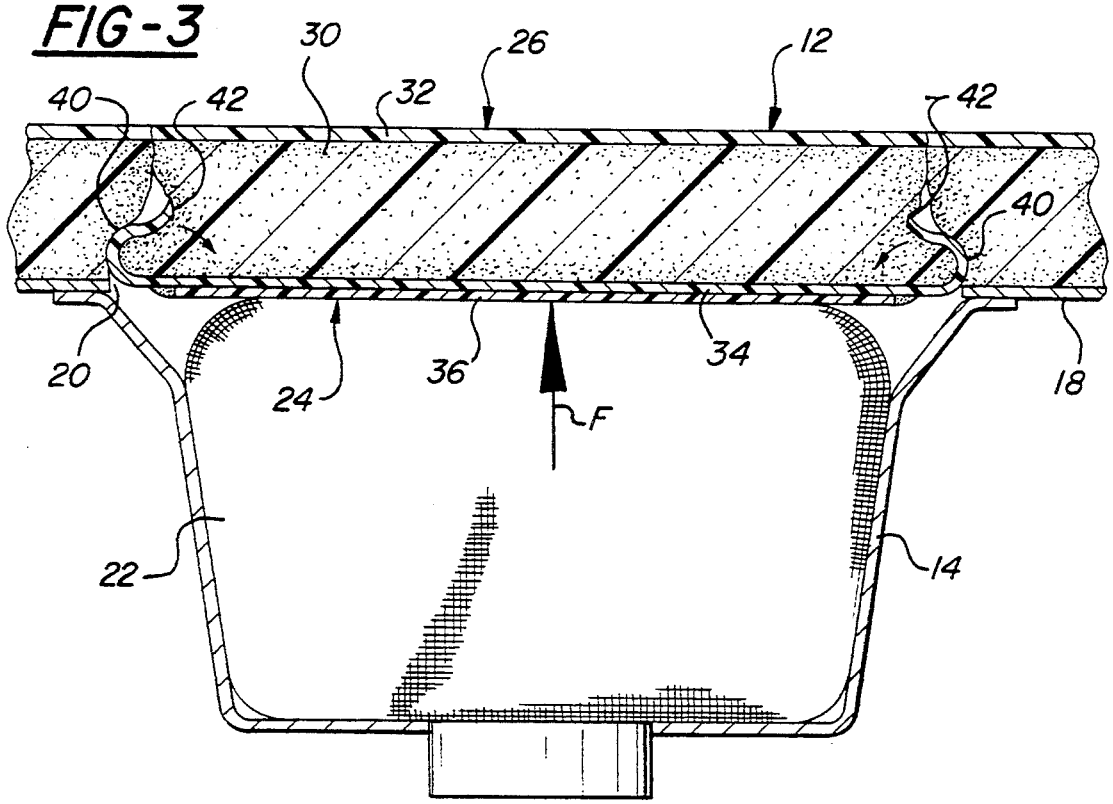

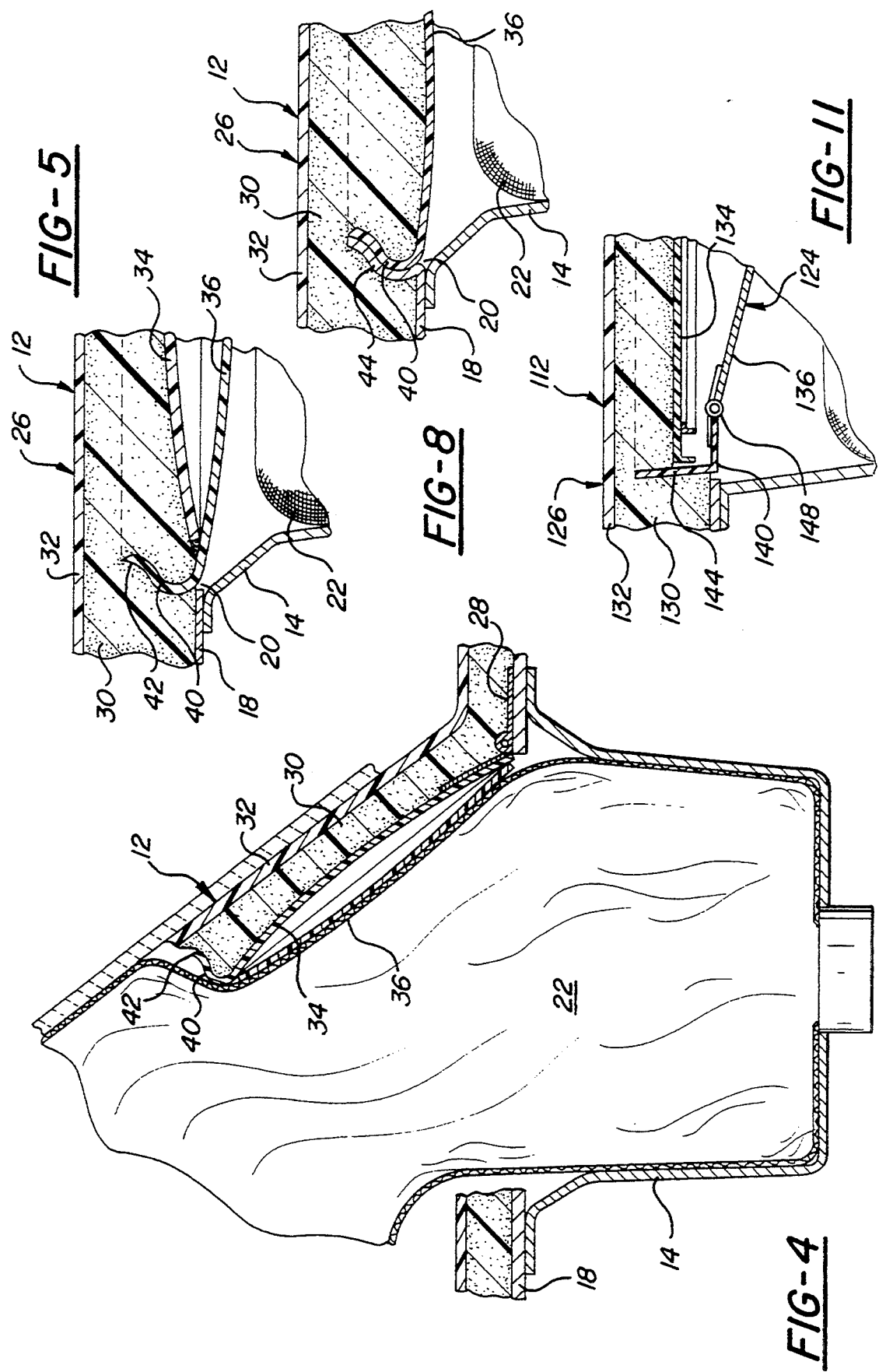

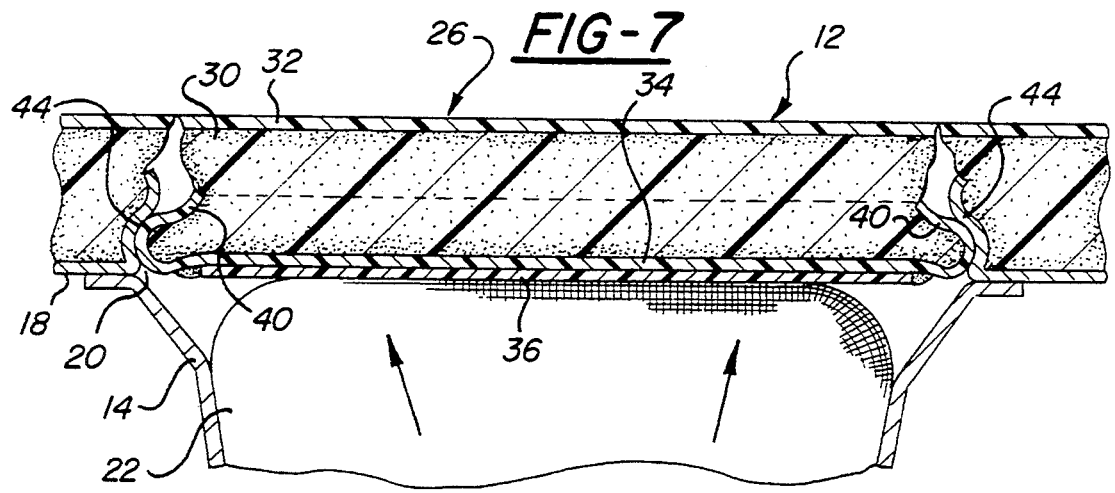
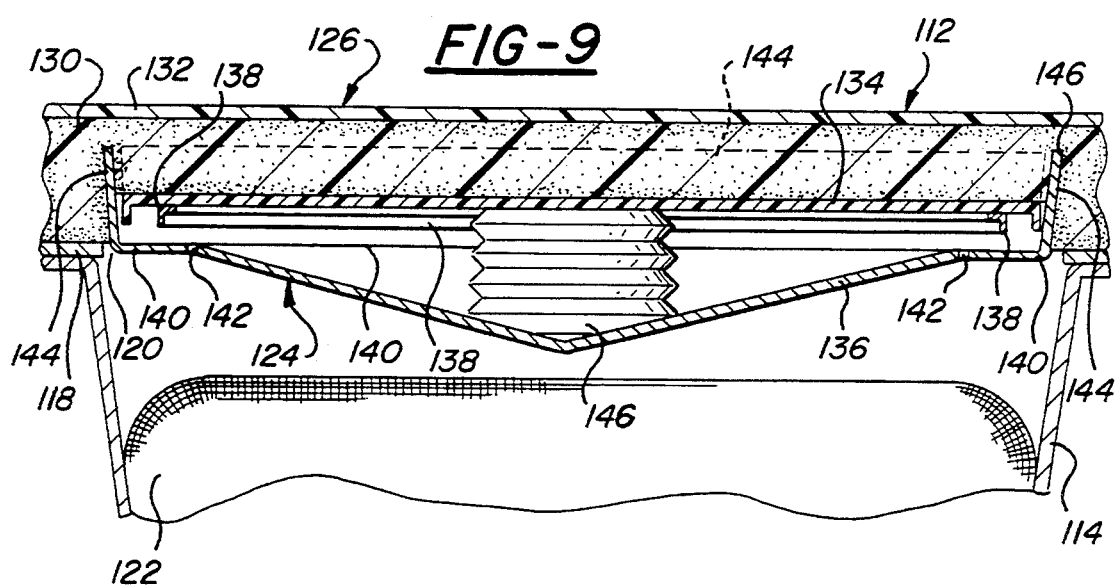
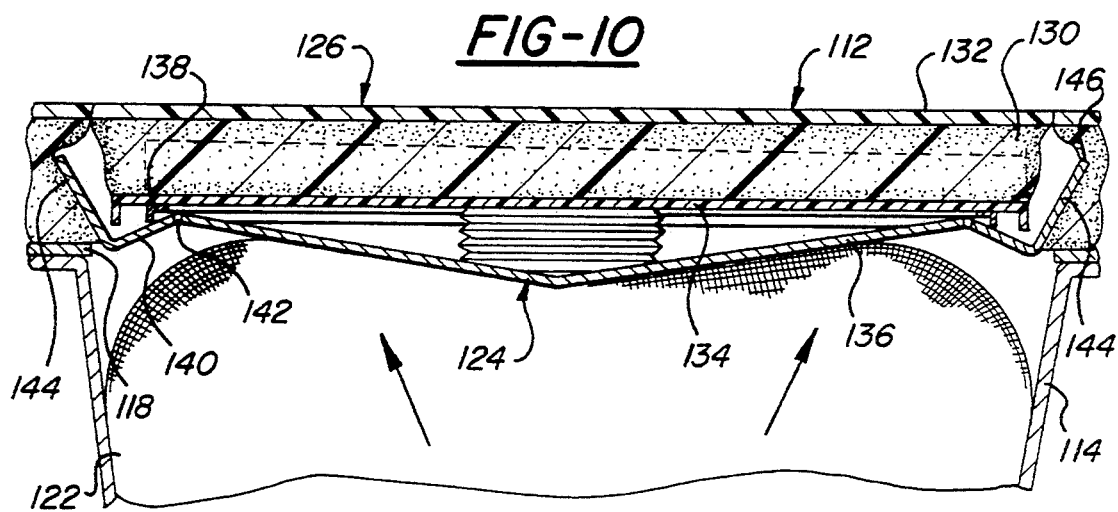

ously in the center before the door edges release. When the impingement member is formed as an inner panel of the air bag door, the reaction member may be provided as an outer panel of the air bag door or a part of the support for the cover assembly or both.

AIR BAG COVER ASSEMBLY

BACKGROUND OF THE INVENTION

This invention relates generally to air bag cover assemblies and more particularly to air bag cover assemblies that have an "invisible" air bag door beneath a covering that is torn open when the air bag door is pushed open by an inflating air bag.

The covering usually comprises a thin flexible skin of polyvinyl chloride and an underlying layer of resilient polyurethane foam although other suitable thermoplastic materials may be used for the skin and the foam.

These cover assemblies may include piercing or cutting devices that are actuated by the inflating air bag to assist in piercing and tearing through the covering when the invisible air bag door is pushed opened.

For instance U.S. Pat. No. 5,035,444 granted to James Carter Jul. 30, 1991 discloses a cover assembly that includes a single pivotal cutter with three blade edges disposed beneath an invisible air bag door. The inflating air bag pivots the cutter outwardly pushing the blade edges up to cut through the foam layer and outer skin of the covering before the air bag door is pushed open. The cutter is bent for self retainment against a windshield following air bag deployment to shield the cutting edges from passenger contact.

U.S. Pat. No. 5,046,758 granted to Scott Rafferty, Bruce Batchelder and Mark Dupris Sep. 10, 1991 discloses a cover assembly that includes several pivotal cutters disposed beneath an invisible air bag door. These several cutters are also pivoted up by the inflating air bag to cut through the foam layer and outer skin of the covering to release the air bag door. The cutters are arranged to self retract to their initial position in the cover assembly following air bag deployment to shield the cutting edges from passenger contact.

While these arrangements are satisfactory for their intended purpose, the arrangements require special provisions as noted for shielding the cutting edges from passenger contact. This is because the arrangements rely on an extension principle where cutting edges are pushed up relative to the air bag door through the foam layer and skin of the covering.

SUMMARY OF THE INVENTION

The object of this invention is to provide an air bag cover assembly that includes a mechanism for assisting release of an invisible air bag door that does not rely on an extension principle for operation.

Another object of this invention is to provide an air bag cover assembly that includes a mechanism for assisting release of an invisible air bag door that does not require any special provision for shielding cutter blades.

A feature of the invention is that the cover assembly has an air bag door that includes tabs that are located in a resilient foam cushion of the covering and rotated laterally or retracted to break the foam layer and thereby assist in the release of the air bag door when the air bag is deployed.

Another feature of the invention is that the cover assembly has an air bag door that includes tabs that are located in a resilient foam cushion of the covering and an impingement member that cooperates with a reaction member of the air bag cover assembly when it is impinged upon by the inflating air bag so as to laterally rotate or retract the tabs for assisting in the release of the air bag door.

Another feature of the invention is that the cover assembly has an air bag door that includes tabs that are located in a resilient foam cushion of the covering and attached to an impingement member or a reaction member that cooperate with each other when the impingement member is impacted upon by the inflating air bag to laterally rotate or retract the tabs for assisting in the release of the air bag door.

The impingement member may be formed as an inner panel of the air bag door that is shaped to take advantage of the observation that an air bag door that is impacted by an inflating air bag normally bulges upwardly in the center before the door edges release. When the impingement member is formed as an inner panel of the air bag door, the reaction member may be provided as an outer panel of the air bag door or a part of the support for the cover assembly or both.

The air bag door may be formed as a double wall construction comprising an inner panel that provides the impingement member and an outer panel that provides the reaction member with the panels being shaped to flatten out under pressure of the inflating air bag and rotate edge tabs attached to one panel or the other laterally to assist in releasing the air bag door.

The air bag door may be formed with an inner panel that provides the impingement member and the support for the cover assembly may be formed with tab retainers that provide the reaction member that cooperates with the impingement member to assist in releasing the air bag door. The tab retainers may replace or supplement the function of the edge tabs associated with the inner panel or an outer panel when a double wall construction for the air bag door is used.

The air bag door may be formed as a double wall construction comprising an inner panel that provides the impingement member and an outer panel that provides the reaction member with the panels being shaped to collapse under pressure of the inflating air bag and retract edge tabs attached to the inner panel to assist in releasing the air bag door.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 3 is a section similar to FIG. 2 showing the air bag covering reacting to deployment of the air bag;

FIG. 4 is a section taken substantially along the line 4—4 of FIG. 1 but showing the air bag covering after deployment of the air bag;

FIG. 5 is a fragmentary sectional view of a second embodiment of the invention;

FIG. 6 is a section similar to FIG. 2 showing a third embodiment of the invention;

FIG. 7 is a section similar to FIG. 3 showing the third embodiment reacting to deployment of the air bag;

FIG. 8 is a fragmentary sectional view of a fourth embodiment of the invention;

FIG. 9 is a section similar to FIG. 2 showing a fifth embodiment of the invention;

FIG. 10 is a section similar to FIG. 3 showing the fifth embodiment reacting to deployment of the air bag; and FIG. 11 is a fragmentary sectional view of a sixth embodiment of the invention.

DESCRIPTION OF THE INVENTION

Figure 1:
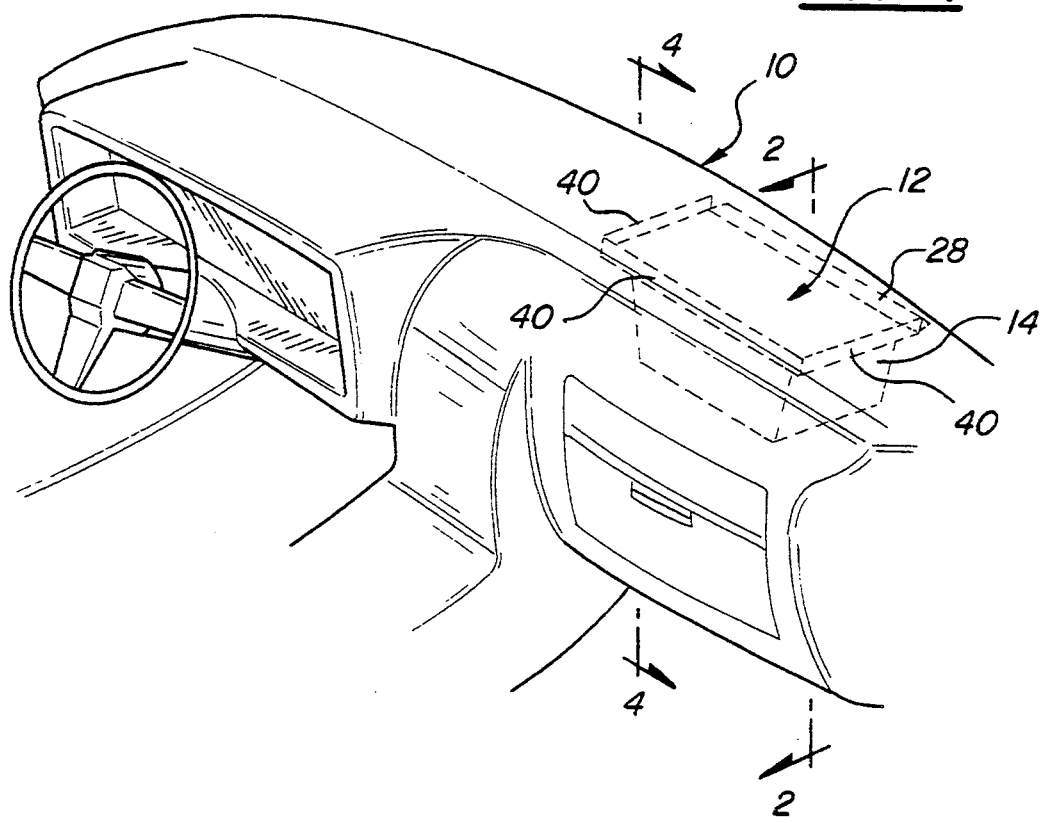
FIG. 1 is a perspective view of an automotive instrument panel equipped with an air bag cover in accordance with the invention.

Referring now to the drawing and more particularly to FIG. 1, an automotive instrument panel 10 includes a cover assembly 12 for concealing an air bag assembly 14 of an air bag restraint system in a passenger compartment. Air bag restraint systems are well known and consequently need not be described in detail. Suffice it to say that the air bag restraint system includes a housing or canister which encloses a gas generator that supplies inflatant to an air bag stored in a collapsed condition within the housing. The air bag inflates in response to a vehicle deceleration of a predetermined magnitude sensed by an inertial sensor that triggers the gas generator to inflate the air bag. The inflating air bag pushes through the cover assembly 12 for deployment in the passenger compartment.

The cover assembly 12 for concealing the air bag assembly 14 is commonly referred to as an invisible air bag door arrangement because the covering of the air bag door is an integral part of a larger covering of a more comprehensive assembly such as an instrument panel rather than a separate covering for the air bag door per se. The integrated covering of the invisible air bag door arrangement may include style lines or weakened tear lines that outline or at least indicate the presence of the air bag door beneath the covering and hence the air bag door is not necessarily totally invisible. In any event these invisible air bag door arrangements require that the covering be torn open to release the air bag door beneath the covering for air bag deployment. This invention provides a cover assembly that includes a device or mechanism that assists in tearing the covering open when the air bag is deployed.

Figure 2:
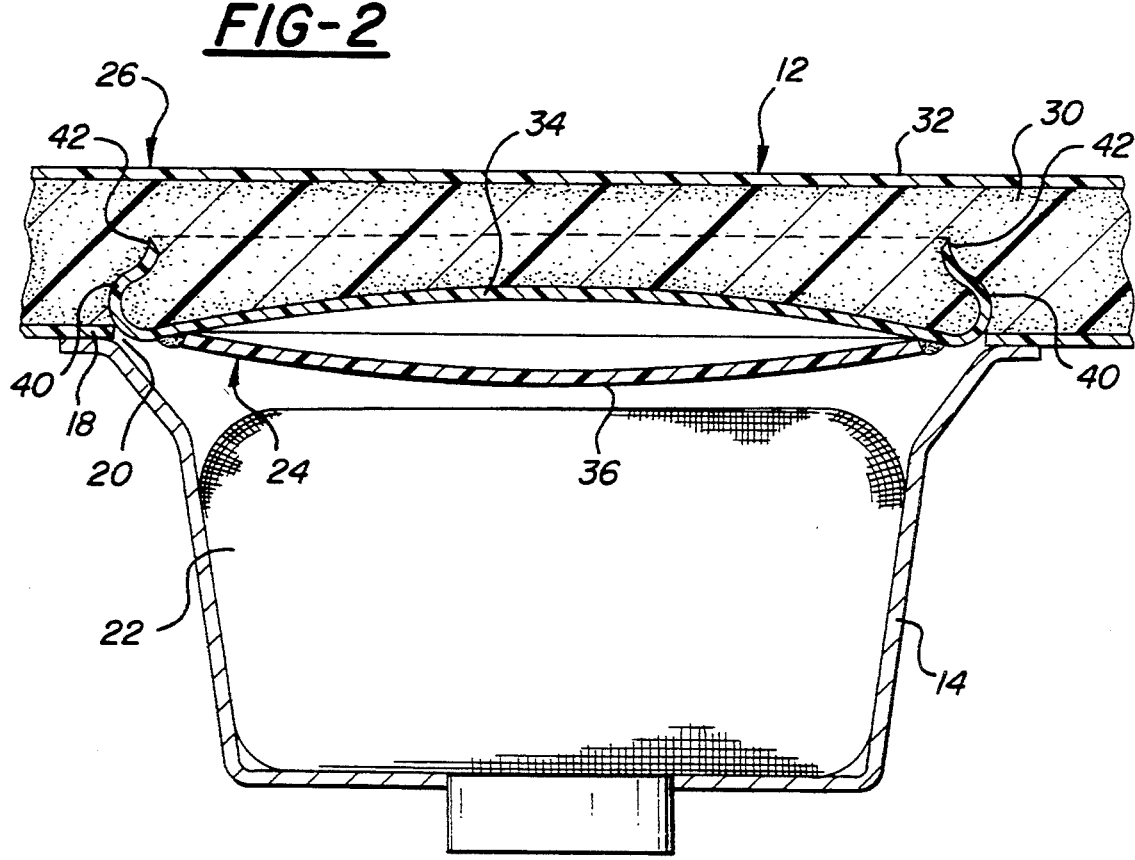
FIG. 2 is a section taken substantially along the line 2—2 of FIG. 1 looking in the direction of the arrows.

Referring now to FIG. 2, the cover assembly 12 comprises an instrument panel retainer or support 18 that is usually molded of a relatively rigid fiber reinforced thermoplastic or other structural plastic. The support 18 has a rectangular opening 20 for deployment of an air bag 22 that is stored in a deflated condition in a canister or housing of the air bag assembly 14. The air bag opening 20 of the instrument panel retainer 18 is closed by a rectangular air bag door 24 that has a covering that is an integral part of the covering 26 for the instrument panel 10 that includes the retainer or support 18.

The door 24 is connected to the support 18 by a hinge 28 at one end for movement between the closed position shown in FIG. 2 where it closes the opening 20 in the support 18 and an open position shown in FIG. 4 where it is forced open by deployment of the air bag 22.

The outer surface of the support 18 and the door 24 are bonded to an elastomeric cushion 30 of polyurethane foam or the like that is formed in an underlying relationship to a polymeric skin 32 that forms an outer surface of the covering 26 for the instrument panel 10.

The door 24 is a double wall construction comprising an outer dome panel 34 that acts as a reaction member and an inner dish panel 36 that acts as an impingement member. The peripheral edge of the inner dish panel 36 is adhesively bonded, welded or otherwise suitably secured to the underside of the outer dome panel 34 inwardly of its outer edge. Consequently the panels 34 and 36 flatten in response to inflation of the air bag 22 when it impinges upon or impacts the inner dish panel 36 and applies a force at the center of the inner dish panel 36 as indicated by the arrow F in FIG. 3.

The outer dome panel or reaction member 34 has upright edge tabs 40 on its three unhinged sides that are located or embedded in the elastomeric foam cushion 30. The edge tabs 40 are S-shaped and first curl inwardly toward the center of the panel 34 and then curve in a reverse direction. These upright edge tabs 40 rotate laterally inwardly with their tips 42 moving laterally inwardly when the panels 34 and 36 are flattened by the force of the inflating air bag impinging on the inner dish panel 36. The lateral rotation of the edge tabs 40 assists in tearing the elastomeric foam cushion 30 and polymeric skin 32 apart as the air bag door 24 is forced open by the inflating air bag being deployed as shown in FIG. 3. The polymeric skin 32 may also have internal or external weakened tear lines (not shown) that facilitate the tearing of the polymeric skin 32.

Each of the three unhinged sides of the outer door panel 34 may be provided with a single continuous edge tab 40 or with a plurality of spaced edge tabs 40. The edge tabs 40 can also be made an integral part of the inner panel 36 instead of the outer panel 34 as shown in an alternate embodiment of FIG. 5. In this case the edge tabs 40 rotate laterally outwardly and their tips 42 move laterally outwardly when the door panels 34 and 36 are flattened in response to the impact of the inflating air bag against the inner door panel 36.

In either event the edge tabs 40 are sized so that the tips 42 are well below the skin layer 32 so that the tabs 40 are shielded by the resilient foam cushion 30 under normal conditions prior to air bag deployment. After deployment these sized edge tabs 40 are also shielded by the foam cushion 30 which recovers after the air bag is deployed as best shown in FIG. 4.

Another embodiment is shown in FIGS. 6 and 7. In this embodiment, the instrument panel support 18 may include retaining tabs 44 at three edges of the air bag hole 20 that are located in the elastomeric foam cushion 30 beneath the polymeric skin 32. The retaining tabs 44 are the same size and shape as the S-shaped edge tabs 40 and these tabs 44 may also be provided as a single continuous tab or a plurality of spaced tabs for each of the three edges. In this embodiment the edge tabs 40 attached to the outer panel 34 are nested in the similarly shaped retaining tabs 44 of the support 18. Thus the edge tabs 40 and retaining tabs 44 rotate laterally away from each other and their tips spread apart laterally when the panels 34 and 36 are flattened by the force of the inflating air bag 22 impacting on the inner panel 36 as shown in FIG. 7. Alternatively the nested edge tabs 40 can be a part of the inner panel 36. In either event, the modified support 18 acts as a reaction member and the retaining tabs 44 enhance the cover tearing ability of this alternate embodiment of the invention by supplementing the function of the edge tabs 40.

It is also possible to use a single wall construction for the door 24 when the support 18 is equipped with retaining tabs 44 because the modified support 18 provides a reaction member as noted above. In this embodiment which is shown in FIG. 8, the single wall acts as the inner panel 36 or impingement member that carries the edge tabs 40 that are nested in and retained by the retaining tabs 44.

In the embodiments of FIGS. 6, 7 and 8 the nesting arrangement itself rotates the retaining tabs 44 laterally outwardly because the retaining tabs 44 must spread apart to release the edges of the door panel that have the edge tabs 40. Consequently these nesting arrangements can be modified further so that the retaining tabs 44 replace rather than supplement the function of edge tabs 40. In these alternatives, the edge tabs 40 could simply be replaced by edge beads or curls that rotate significantly in response to the impact of the inflating air bag 22.

Referring now to FIGS. 9 and 10, another embodiment of the invention is shown. In this embodiment, the outer panel of the air bag door is a flat reaction member that provides depending fulcrums and the inner panel is a collapsible impingement member that is equipped with edge tabs that are pivoted outwardly and downwardly by the fulcrums when the inner panel is impacted by the air bag.

Briefly the cover assembly 112 comprises a instrument panel retainer or support 118 of molded plastic that has a rectangular opening 120 for deployment of an air bag 122 that is stored in an air bag assembly 114. This opening is closed by a rectangular air bag door 124 that has a covering that is an integral part of the covering 126 for the support 118.

The door 124 is connected to the support 118 by a hinge at one end for movement between the closed position shown in FIGS. 9 and 10 where it closes the opening 120 in the support 118 and an open position for deployment of the air bag 122 such as the open position shown in FIG. 4 in connection with an earlier embodiment.

The outer surface of the support 118 and the door 124 are bonded to an elastomeric foam cushion 130 formed in an underlying relationship to a polymeric skin 132 that forms the covering 126 and an outer surface of the cover assembly 112.

The door 124 is a double wall construction comprising an outer flat panel 134 and an inner dish panel 136.

The outer flat panel 134 is molded plastic and has an integral hinge at one end for connecting the door 124 to the support panel 118. The outer panel 134 is a reaction member that has three depending fulcrums 138 attached to its underside. The three fulcrums 138 are parallel to and spaced inwardly of the three respective unhinged edges of the rectangular outer panel 134.

The inner dish panel 136 is an impingement member and preferably made of metal. It has three flat end margins 140 that are juxtaposed the fulcrums 138. The end margins 140 are attached to the central impact portion of the dish panel 136 by weakened hinge portions 142 formed by punching lines of holes or slots in the metal panel 136.

The inner dish panel 136 also has flat upright edge tabs 144 on the end margins 140 that are juxtaposed the respective unhinged sides of the outer panel 134 and embedded in the elastomeric foam cushion 130.

The door 124 also includes a collapsible spring 146 that holds the door panels 134 and 136 apart.

When the air bag 122 inflates, it impacts the central portion of the impingement member or inner panel 136 moving it toward the reaction member or outer panel 134 and collapsing the spring 146. As the inner panel 136 collapses into the outer panel 134 the end margins 140 of the inner panel engage the fulcrums 138 and bend the hinge portions 142 downwardly so that the edge tabs 144 are rotated laterally outwardly and downwardly. This retracts the edge tabs 144 with respect to their original position and the outer panel 134 as shown in FIG. 10.

The movement of the edge tabs 144 assists in tearing the elastomeric foam cushion 130 and polymeric skin 132 apart as the air bag door 124 is forced opened by the inflating air bag being deployed.

A single continuous flat edge tab 144 or a plurality of flat edge tabs 40 may be provided for each of the three sides of the inner door panel 136.

In either event the tabs 144 are preferably sized so that the tips 146 are well below the skin layer 132 so that the tabs 140 are shielded by the foam layer 130 which recovers after the air bag 122 is deployed.

Another embodiment is shown in FIG. 11. In this embodiment, the inner panel 136 of the door 124 has end margins 140 that are attached to the central impact portion of the inner panel 136 by braking type hinges 148 that have tight hinge pins that allow the hinge parts to pivot when the inner panel 136 is collapsed into the outer panel 134. Except for the hinge 148, the cover assembly 112 is otherwise the same as the cover assembly 112 shown in FIGS. 9 and 10 and operates in the same manner.

Many other modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A cover assembly for concealing an air bag in a vehicle passenger compartment comprising:
   a support that has an opening for deployment of an air bag;
   a door that is connected to the support at one end for movement between a closed position closing the opening in the support and an open position for deployment of the air bag;
   the outer surface of the support and the door being bonded to an elastomeric foam cushion formed in an underlying relationship to a polymeric skin that forms a covering of the cover assembly,
   the door including an impingement member and a reaction member that is positioned to react with the impingement member,
   one of the members having edge tabs that are located in the elastomeric foam cushion, and
   the impingement member and the reaction member cooperating to rotate the edge tabs laterally in the elastomeric foam cushion beneath the polymeric skin in response to impact of an inflating air bag against the impingement member and assist in tearing the elastomeric foam cushion and polymeric skin apart to release the door when an air bag is deployed,
   the reaction member being an outer panel of the door, and the impingement member underlying the outer panel of the door.

2. A cover assembly for concealing an air bag in a vehicle passenger compartment comprising:
   a support that has an opening for deployment of an air bag;
   a door that is connected to the support at one end for movement between a closed position closing the opening in the support and an open position for deployment of the air bag;

the outer surface of the support and the door being bonded to an elastomeric foam cushion formed in an underlying relationship to a polymeric skin that forms a covering of the cover assembly, the door including an impingement member and a reaction member that is positioned to react with the impingement member, one of the members having edge tabs that are located in the elastomeric foam cushion, and the impingement member and the reaction member cooperating to rotate the edge tabs laterally in the elastomeric foam cushion beneath the polymeric skin in response to impact of an inflating air bag against the impingement member and assist in tearing the elastomeric foam cushion and polymeric skin apart to release the door when an air bag is deployed, and the reaction member being part of the support.

3. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric foam cushion formed in an underlying relationship to a polymeric skin that forms a covering of the cover assembly, the door including an impingement member and a reaction member that is positioned to react with the impingement member, one of the members having edge tabs that are located in the elastomeric foam cushion, the impingement member and the reaction member cooperating to rotate the edge tabs laterally beneath the polymeric skin in response to impact of an inflating air bag against the impingement member and assist in tearing the elastomeric foam cushion and polymeric skin apart to release the door when an air bag is deployed, and the support having retaining tabs that react with the edge tabs to rotate the edge tabs laterally in response to the impact of the inflating air bag against the impingement member.

4. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door including an outer panel and inner dish panel underlying the outer panel that engages the outer panel so that the inner panel deforms in response to an inflating air bag impacting on the inner panel; and one of the panels having edge tabs that are embedded in the elastomeric cushion and that have tips that move laterally in the elastomeric cushion when the inner panel deforms to assist in tearing the elastomeric cushion and polymeric skin when the air bag is deployed.

5. The cover assembly for concealing an air bag in a vehicle passenger compartment as defined in claim 4 wherein:

the edge tabs are formed on the inner panel and the outer panel has edges that are engaged by the inner panel when the air bag is deployed so that the tips of the edge tabs move laterally when the inner panel deforms.

6. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door comprising an outer dome panel and an inner dish panel underlying the outer dome panel that react with each other to flatten in response to an inflating air bag impacting on the inner panel; and one of the panels having edge tabs that are embedded in the elastomeric cushion and that have tips that move laterally in the elastomeric cushion when the panels flatten to assist in tearing the elastomeric cushion and polymeric skin to release the door when the air bag is deployed.

7. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door comprising an outer dome panel and an inner dish panel that react with each other to flatten in response to an inflating air bag impacting on the inner panel;

one of the panels having edge tabs that are embedded in the elastomeric cushion and that have tips that move laterally when the panels flatten to assist in tearing the elastomeric cushion and polymeric skin to release the door when the air bag is deployed, and the support having retaining tabs that react with the edge tabs to spread the retaining tabs and the edge tabs apart when the panels flatten.

8. The cover assembly for concealing an air bag in a vehicle passenger compartment as defined in claim 7 wherein:

the retaining tabs are similar in shape to the edge tabs and the edge tabs are nested in the retaining tabs so that the retaining tabs and the edge tabs spread apart when the panels flatten.

9. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door comprising an outer panel and an inner dish panel that underlies the outer panel and engages the outer panel so that the inner panel deforms in response to an inflating air bag impacting on the inner panel; and the inner panel having edge tabs that are located in the elastomeric cushion and that have tips that move laterally when the inner panel is deformed to assist in tearing the elastomeric cushion and polymeric skin to release the door when the air bag is deployed.

10. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door comprising an outer panel and an inner dish panel that engages the outer panel so that the inner panel deforms in response to an inflating air bag impacting on the inner panel;

the inner panel having edge tabs that are located in the elastomeric cushion and that have tips that move laterally when the inner panel is deformed to assist in tearing the elastomeric cushion and polymeric skin to release the door when the air bag is deployed, the outer panel having depending fulcrums that engage the inner panel inwardly of the edge tabs and the inner panel having hinge portions inwardly of the depending fulcrums so that the edge tabs retract with respect to the outer panel when the inner panel deforms.

11. The cover assembly for concealing an air bag in a vehicle passenger compartment as defined in claim 10 wherein:

the inner and the outer panels have central portions, and a spring is disposed between the outer panel and the inner panel for spacing the central portions of the panels apart.

12. The cover assembly for concealing an air bag in a vehicle passenger compartment as defined in claim 11 wherein:

the hinge portions of the inner panel are integral weakened hinge portions of the inner panel.

13. The cover assembly for concealing an air bag in a vehicle passenger compartment as defined in claim 11 wherein:

the hinge portions of the inner panel are braking hinges.

14. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door including an outer dome shaped panel and an inner dish panel that engages the outer panel so that the inner panel deforms in response to an inflating air bag impacting on the inner panel; and the outer panel having edge tabs that are embedded in the elastomeric cushion and that have tips that move laterally when the inner panel deforms to assist in tearing the elastomeric cushion and polymeric skin when the air bag is deployed.

15. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door including an outer panel and an inner dish panel that engages the outer panel so that the inner panel deforms in response to an inflating air bag impacting on the inner panel;

the inner panel having edge tabs that are embedded in the elastomeric cushion and that have tips that move laterally when the inner panel deforms to assist in tearing the elastomeric cushion and polymeric skin when the air bag is deployed, and the outer panel having depending fulcrums that are engaged by the inner panel when the air bag is deployed so that the tips move inwardly with respect to the outer panel when the inner panel deforms.

16. A cover assembly for concealing an air bag in a vehicle passenger compartment comprising:

a support that has an opening for deployment of an air bag;

a door that is connected to the support at one end for movement between a closed position closing the opening in the support and an open position for deployment of the air bag;

the outer surface of the support and the door being bonded to an elastomeric cushion formed in an underlying relationship to a polymeric skin that forms an outer surface of the cover assembly, the door including an outer panel and an inner dish panel that engages the outer panel so that the inner panel deforms in response to an inflating air bag impacting on the inner panel;

one of the panels having edge tabs that are embedded in the elastomeric cushion and that have tips that move laterally when the inner panel deforms to assist in tearing the elastomeric cushion and polymeric skin when the air bag is deployed, and a spring disposed between the outer panel and the inner panel for spacing central portions of the panels apart.

* * * * *